United States Patent
Parnell et al.

(10) Patent No.: US 8,140,375 B2
(45) Date of Patent: Mar. 20, 2012

(54) VOTING ON CLAIMS PERTAINING TO A RESOURCE

(75) Inventors: Korby Shane Parnell, Redmond, WA (US); Robert Rebholz, Woodinville, WA (US); Eric Mahlberg, Redmond, WA (US); Jason McCullough, Seattle, WA (US); Benjamin Daniel Martin, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1341 days.

(21) Appl. No.: 11/787,946

(22) Filed: Apr. 18, 2007

(65) Prior Publication Data
US 2008/0262906 A1    Oct. 23, 2008

(51) Int. Cl.
*G06Q 10/00* (2006.01)

(52) U.S. Cl. ............... 705/7.29; 705/7.31; 705/7.32; 705/309

(58) Field of Classification Search ........ 705/7.11–7.29, 705/7.31–7.38, 309
See application file for complete search history.

(56) References Cited

U.S. PATENT DOCUMENTS

| | | | |
|---|---|---|---|
| 5,668,953 A * | 9/1997 | Sloo | 705/309 |
| 5,678,041 A | 10/1997 | Baker et al. | |
| 5,895,450 A * | 4/1999 | Sloo | 705/309 |
| 6,163,778 A | 12/2000 | Fogg et al. | |
| 6,480,852 B1 | 11/2002 | Himmel et al. | |
| 6,591,265 B1 | 7/2003 | Erickson et al. | |
| 7,072,888 B1 | 7/2006 | Perkins | |
| 7,085,925 B2 * | 8/2006 | Hanna et al. | 713/157 |
| 7,099,859 B2 | 8/2006 | Sundaresan | |
| 7,251,607 B1 * | 7/2007 | Veschi | 705/309 |
| 7,343,295 B2 * | 3/2008 | Pomerance | 705/309 |
| 7,363,214 B2 * | 4/2008 | Musgrove et al. | 704/9 |
| 7,519,562 B1 * | 4/2009 | Vander Mey et al. | 705/500 |
| 7,617,128 B2 * | 11/2009 | Greak | 705/26.35 |
| 7,620,636 B2 * | 11/2009 | Fasciano | 1/1 |
| 7,860,928 B1 * | 12/2010 | Anderson | 709/204 |
| 2002/0073174 A1 * | 6/2002 | Mengerink et al. | 709/219 |
| 2002/0161597 A1 * | 10/2002 | Klibaner | 705/1 |
| 2002/0198866 A1 * | 12/2002 | Kraft et al. | 707/3 |
| 2003/0204439 A1 | 10/2003 | Cullen, III | |
| 2005/0004880 A1 * | 1/2005 | Musgrove et al. | 705/400 |
| 2005/0234937 A1 | 10/2005 | Ernest et al. | |
| 2006/0088645 A1 * | 4/2006 | Nietling et al. | 426/601 |
| 2006/0105314 A1 * | 5/2006 | Corn et al. | 434/350 |
| 2006/0282304 A1 * | 12/2006 | Bedard et al. | 705/10 |
| 2006/0286530 A1 * | 12/2006 | Forrest et al. | 434/323 |

(Continued)

OTHER PUBLICATIONS

"Building a Simple Rating Control for ASP.NET 2.0", http://imar.spaanjaars.com/QuickDocId.aspx?quickdoc=410.

(Continued)

*Primary Examiner* — Lynda Jasmin
*Assistant Examiner* — Alan S Miller

(57) ABSTRACT

A credibility card contains a claim about a resource, a way to identify the claimant, and a set of choices to be voted on about the claim. A resource can be information content, a product, or another item about which a claim can be made, and it may be associated with a Uniform Resource Indicator (URI). Information (e.g., a web page) that contains or describes the resource includes the credibility card, and a user viewing the information is given the chance to vote on the claims, such as by indicating agreement or disagreement with the claim. The votes are stored in a repository, which may protect the votes from being deleted. Users can view the tally of votes in order to judge the credibility of the claim or the claimant.

17 Claims, 5 Drawing Sheets

U.S. PATENT DOCUMENTS

| | | | |
|---|---|---|---|
| 2007/0055612 A1* | 3/2007 | Palestrant et al. | 705/37 |
| 2007/0061217 A1* | 3/2007 | Palestrant et al. | 705/26 |
| 2007/0136657 A1* | 6/2007 | Blumenthal et al. | 715/512 |
| 2007/0162458 A1* | 7/2007 | Fasciano | 707/10 |
| 2007/0219958 A1* | 9/2007 | Park et al. | 707/3 |
| 2008/0235721 A1* | 9/2008 | Ismail et al. | 725/16 |
| 2008/0262906 A1* | 10/2008 | Pamell et al. | 705/12 |
| 2008/0270326 A1* | 10/2008 | Musgrove et al. | 705/400 |

OTHER PUBLICATIONS

"Choices in the Implementation of Rating" http://cmc.dsv.su.se/select/rating-choices.html#Heading5.

Baker, et al., "Local Control over Filtered WWW Access", http://www.w3.org/Conferences/WWW4/Papers/117/.

http://jyte.com.

* cited by examiner

VOTING ON CLAIMS PERTAINING TO A RESOURCE

BACKGROUND

Web sites, and other providers of information, often allow users to give feedback on the quality of the information. For example, a user may search for an article on a web site, and the article found in the search may conclude with a questionnaire allowing the user to rate the helpfulness of the article—either as helpful/unhelpful or on a numeric scale (e.g., "rate the helpfulness of this article on a scale of 1 to 5, where 1=very unhelpful and 5=very helpful"). The results of the ratings are collected, and can be provided to the publisher of the information as a gauge of the public's opinion of the information. Also, the results can be posted on the web site itself to assist other users in judging the value of the information (e.g., "40 out of 85 users found this review helpful" or "the average score for this article is 3.9 out of 5.0").

However, these types of questionnaires have a very low response rate—often less than one percent—and the results may be difficult to interpret. "Helpfulness" of an article can have different meaning to different users (e.g., the article may not have answered the question for which the user initiated the search, but may have provided some unexpected useful information). Moreover, with numeric scales, different users tend to assign different meanings to the numbers on the scale. Experience shows that the prevalence of individual votes is skewed heavily toward the extreme high and low ends of the scale.

In addition, these questionnaires tend to ask mainly about generic issues (e.g., "Was this article helpful?" or "Did this article answer your question?"), so the results of the questionnaire do not normally tell users anything specifically relevant to the article. Also, a questionnaire indicating that users found the article "helpful" or "unhelpful" is, in effect, an anonymous assertion, made collectively by a large number of prior readers who have little stake in the credibility of the assertion.

SUMMARY

A credibility card contains a claim about a resource, a mechanism to vote on the claim, and an identification of the person or other entity that makes the claim. A resource can be information content (e.g., a textual article, music, video, a program, etc.), a product (e.g., a computer, a printer, food, etc.), or any item about which a claim can be made. The credibility card can be included with information, such as a web page, that contains or describes the resource. The credibility card includes a set of choices about the claim—such as "agree," "disagree," or "unsuitable"—on which a user can vote. The votes are stored in a repository, and may be protected against being deleted.

The tally of votes in the repository can be viewed by users who want to judge the credibility of a claim, or of the claimant. For example, if the votes on a claim indicate that the majority of voters disagree with the claim, a user may conclude that the claim is not credible. Moreover, since the credibility card associates the claim with the identity of a particular claimant, claims that the majority disagrees with tend to reflect negatively on the claimant's credibility, which can affect the perceived credibility of other claims made by the same claimant. Thus, maintaining a tally of votes (especially a tally that is protected against deletion) serves as a disincentive to make incredible claims, thereby providing accountability within an on-line community.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
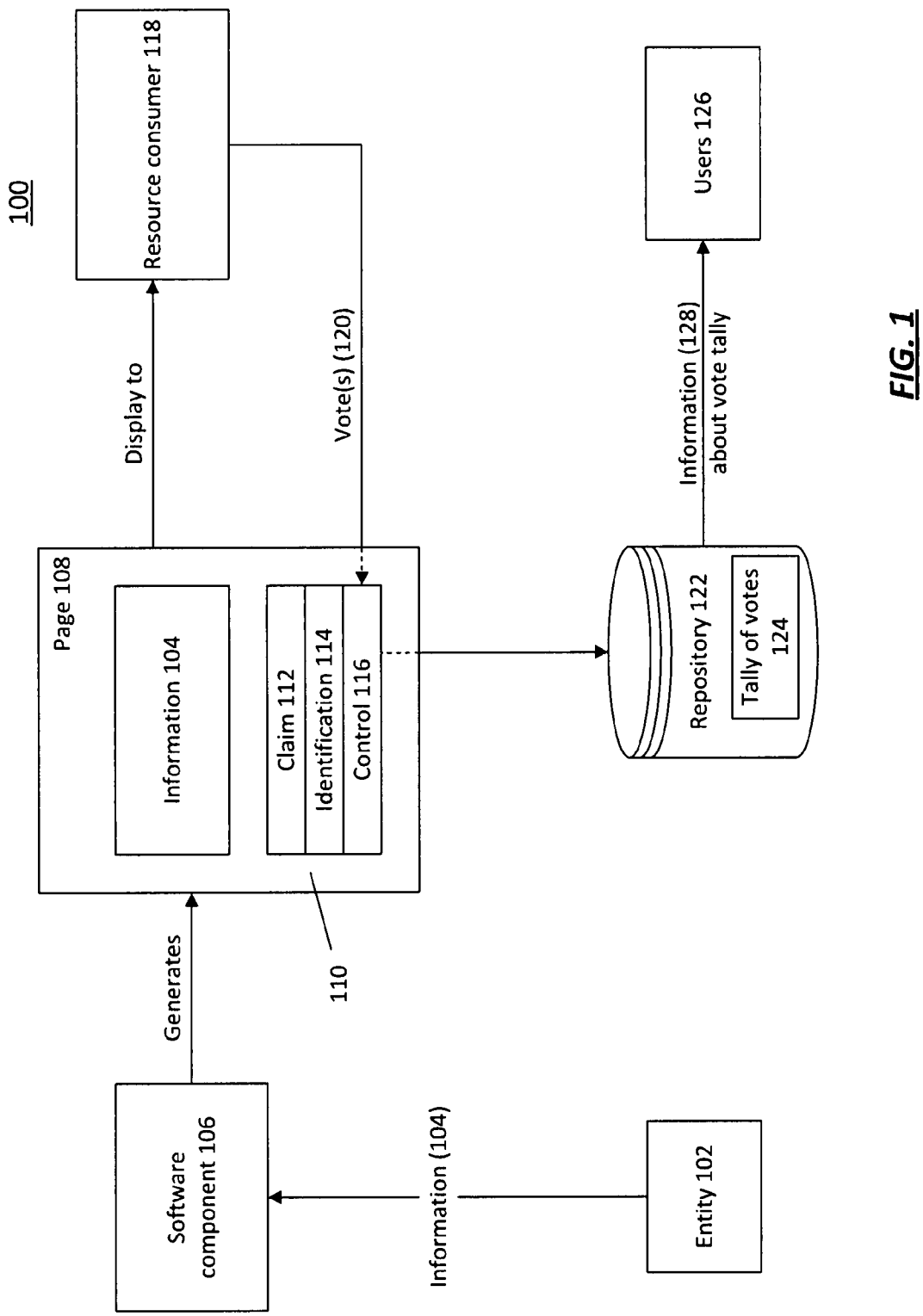
FIG. 1 is a block diagram of example components and actors that participate in creating, and voting on, claims.

Information, such as web content, includes chaff among the wheat, so it is often desirable for users to have a mechanism to judge the value of the information they are consuming. A credibility card provides an interactive rating mechanism that can be customized for a particular piece of information, and that encourages users to make credible statements about the information. These statements can assist users in judging the nature and value of the information.

A credibility card may include a claim about a resource, a claimant's name (or other identification of a claimant), one or more controls or other mechanisms that allow users to vote on the claim, and/or other items. A resource can be information content (e.g., text, music, video, program code, etc.), or could be a product or other item about which a claim can be made. If the resource is information content, then the claim may relate to the information content (e.g., "The information in this article is accurate"). If the resource is a product or other item, then the information may describe the resource (e.g., a review of a product), and the claim may relate either to the resource itself, or to the information that describes the resource. For example, if the resource is a printer that is being reviewed, then the claim could state ("This printer prints 25 pages per minute," or "This review accurately describes the printer's capabilities.") The claim may be chosen based on its pertinence to the resource in question—e.g., by allowing the user to write a claim from scratch that pertains to the resource, or by allowing the user to select an appropriate claim from a set of pre-defined claims. Claims that are pertinent to the resource in question tend to have a high value as compared with more general assertions.

Users who view the information are presented with the credibility card and are given the chance to vote on the claim. Typically, the voting choices will include "agree" and "disagree." It may also be useful to include a third choice, such as "unsuitable," indicating that the claim is ambiguous, unclear, irrelevant to the resource in question, or in some manner not on point. A vote indicating that many users consider the claim to be unsuitable tends to indicate that the claim, or its claimant, is not credible. Therefore, including this third choice among the voting options can provide high information value. Offering a small number of choices (e.g., two or three) tends to reduce confusion as to the meaning of the choices, and also tends to cause the choices to have a well-defined meaning that can be readily understood by users. Of course, the mechanisms described herein can be used to provide any number and/or type of choices. Moreover, the choices can be represented in any manner, such as words, graphics, etc.

The entity who makes and stands behind the claim is the claimant, and the claimant's name, or other identifying information, is included in the credibility card. Including the claimant's identity gives the claimant a stake in making credible claims, since an on-line community may devalue claims of a claimant who has been known in the past to make claims that receive a large number of "disagree" (or "unsuitable") votes.

The claimant may be the author or publisher of a piece of information, in which case the author or publisher can choose the claim(s) that relates to the information that he or she provides. Allowing authors or publishers to specify the claims that apply to their information means that such an author or publisher effectively defines the terms by which readers rate the information provided by the authors or publishers. In this sense, allowing authors or publishers to specify the claims that apply to their information can help authors or publishers to gain recognition for what matters to them. Thus, in addition to facilitating accountability for claims, credibility cards may also encourage more authors or publishers to solicit ratings of their content.

Credibility cards can be implemented by a variety of mechanisms, such as a control (e.g., an IFrame), or a block of structured code (e.g., eXtensible HyperText Markup Language ["XHTML"] code such as a microformat, or other code).

Credibility cards can be viewed as fostering a "folksonomical" rating system, in the sense that they encourage communities of users to define the terms on which resources are rated.

Example Use of Credibility Cards

FIG. 1 shows an example system 100 in which credibility cards are created and used.

Entity 102 provides or creates information 104 concerning a resource, and provides information 104 to software component 106. A resource may, for example, be a content item (e.g., text, music, video, program code, a template, etc.) or a product (e.g., an electronic device, a book, etc.), or any item about which a claim can be made. The nature of a resource is described below in connection with FIG. 2. In one example, entity 102 may be a creator or publisher of a content item, and information 104 may be the content item itself. In another example, entity 102 may be a reviewer, vendor, or manufacturer of a product, and information 104 may be a review of the product.

Software component 106 receives information 104 and generates a page 108 that contains information 104, and a credibility card 110. Page 108 may be a web page in a format such as Hypertext Markup Language (HTML), extensible Markup Language (XML), or other format. Page 108 may be displayed or otherwise provided to a user, such as resource consumer 118. For example, page 108 may be displayed in a browser that runs on resource consumer 118's computer. Page 108 is used as an example of content that can be generated by software component 106, although the subject matter described herein is not limited to any particular form of such content.

Generation of page 108 by software component 106 may be as simple as saving a page that has already been created in an appropriate format—e.g., if information 104 is provided by entity 102 in a markup format, then software component 106 may generate the page by saving the provided markup, and, optionally, adding credibility card 110 to the markup. As another example, information 104 can be some form of raw information, and software component 106 may process information 104 to include it in a page 108 in an appropriate format along with credibility card 110. Moreover, it should be noted that software component 106 may create credibility card 110 at the request of a user such as entity 102, or may initiate creation of credibility card 110 on behalf of entity 102. The latter scenario may be particular useful in the case where software component 106 is operated by a web site provider that wants to encourage the use of credibility cards for content posted on the operator's web site.

Credibility card 110 may include a claim 112, an identification 114, and a control 116, which are described below.

Claim 112 contains an assertion about a resource. For example, if the resource comprises program code, then claim 112 may be an assertion such as "This is a good program," or "The code contained in this program compiles." In another example, if the resource comprises a product (e.g., a printer), then claim 112 may be an assertion such as "This printer prints 25 pages per minute." The claim may be chosen based on its pertinence to the resource. For example, "The code contained in this program compiles" is a pertinent claim if the resource includes program code, but has less relevance to music, video, or a book. Moreover, the choice of claim may be made by the entity 102 that provides information 104, possibly by choosing from a set of pre-defined claims. However, the subject matter described herein is not limited to claim 112's being any particular type of claim. Additionally, it should be noted that the claimant (as mentioned above) makes or stands behind the claim, and this claimant may, in fact, be the entity 102 who provides information 104. However, the claimant and entity 102 need not be the same person or entity, since a claim can be made by someone other than the person or entity that provides information.

Identification 114 contains an identification of the entity 102 that provides information 104. Identification 114 may include the entity's name, a photo, a symbol, a link to an on-line profile, or other identifying information. Identification 114 may be used to tie the claim to the person making the claim. As discussed below, the claims may be voted upon by users, and it is desirable for a community of users to be able to judge the credibility of a claimant based on whether voters tend to agree or disagree with the claims made by that claimant. Using identification 114 to tie claim 112 to entity 102 provides a mechanism by which a community can make this judgment.

Control 116 is a mechanism that presents a set of choices to be voted on, and collects a user's votes on those choices. For example, control 116 may present choices such as "agree" or "disagree" (indicating a user's agreement or disagreement with the claim). Also, control 116 may present additional choices such as "unsuitable" (indicating that a user believes the claim is ambiguous, unclear, irrelevant to the resource in question, in some manner not on point, etc.), "add a comment" (allowing the user to respond to evaluate the claim with a free-form comment), "send mail" (allowing the user to send e-mail to the entity 102 who made the claim), "abusive" (indicating that the user believes the claim to be in some manner inappropriate), and/or "add a claim" (allowing the user to suggest a new claim about the resource to be added to credibility card 110). The choices presented by control 116 may be represented in the form of words, graphics, or in any other way.

The portion of control 116 that receives the user's vote may be implemented as a set of buttons that the user clicks to register a vote. These buttons can be implemented by various means, such as script that runs in a browser and registers the user's vote, or a set of links to different Uniform Resource Locators (URLs) that correspond to the different voting choices. These mechanisms, or other mechanisms, may be used.

Resource consumer 118 is a user who views information 104. For example, if the resource is a content item such as a program, music, or video, then resource consumer 118 may be a person who uses the program, listens to the music, or views the video. If the resource is a product and information 104 is a review of the product, then resource consumer 118 may be a person who reads the review. Resource consumer 118 may register a vote 120 on claim 112, using control 116. For example, if control 116 provides voting buttons that are rendered by a browser, resource consumer 118 may click on one of the buttons to register a vote, such as "agree."

Vote 120 may be directed to repository 122 for storage. Control 116 may contain code that causes vote 120 to be directed to repository 122. Repository 122 may store a tally 124 of votes. Repository 122 may be implemented on a server, and may be maintained by an organization that is independent of entity 102, resource consumer 118, or users 126 (described below). For example, a web site operator—such as the operator of a web portal, search site, or e-commerce service—may provide credibility cards under its brand name, and thus has an interest in the integrity of the vote. Thus, the operator may configure the control 116 in its credibility cards to direct that the votes be stored in a repository 116 that is maintained by that operator. By maintaining control over repository 122, the operator can prevent the votes from being deleted (e.g., in the case where an entity 102 does not like the vote that has been received and attempts to repudiate the vote by deleting it), which can foster a view in an on-line community that votes are credible. Another aspect that can further integrity or credibility of the votes is to take measure to bind a credibility card 110 and its vote tally to a particular resource (as identified, for example, by a Uniform Resource Indicator (URI)), and to prevent use of credibility card 110 with a different resource associated with a different URI. This means that when a user sees a resource, a claim, and a voting record, the user can have some level of confidence that the claim and voting record were made about the same resource the user is viewing.

Users 126 may be members of the public (e.g., participants in an on-line community) who may judge the credibility of claims by receiving information 128 concerning the vote. (As an alternative to being members of the public, users 126 could also be members of any type of non-public group, such as participants in a private or quasi-private intranet, or may include a combination of public and non-public participants.) Users 126 may include resource consumer 118 who votes on claim 112, but may also include other users regardless of whether they have voted on any particular claim. For example, if a user views credibility card 110 and wants to judge the credibility of the claim 112 contained in the card, or the credibility of the entity 102 that made claim 112, the user can obtain information 128 concerning the vote tally 124. Information 128 may simply be the raw vote tally itself, or may be a summary or analysis of the vote tally. Information 128 can be provided in a form that is displayable to the user (e.g., in the form of a web page that is viewable on the user's browser), or may be received by the user in any other form. A summary of analysis of vote tally 124 may take the form of descriptive expressions based on the prevalence of particular votes—e.g., description along a verbal continuum, such as "best," "great," . . . , "awful," could be generated based on an analysis of how heavily the votes weigh in favor of (or against) agreement with a particular claim.

In one example, the vote tally (or other information relating to a vote) is available along with credibility card 110—e.g., the user may click or roll over a button on credibility card 110 and see the current vote tally 124. Control 116 may facility obtaining the current vote tally from repository 122. As an example, one way to provide the vote tally is through a dedicated web service (which can be implemented at repository 122), which provides the vote tally to client software. The client software can then display, or otherwise use, the information in a manner of the client's choosing.

As noted above, a claim may be chosen based on its pertinence to a given resource, but the choice of a claim can be performed in various ways—e.g., by writing a claim from scratch, choosing from a set of pre-defined claims, using a search engine to search for existing claims, etc. It may be desirable for claim language to be re-used to establish some consistency among claims that have similar meaning, and thus a system that enables the creation of credibility cards may provide an incentive to use pre-existing claims. These incentives may take the form of: providing a search mechanism to give users easy access to claims that have been used before; providing standard wording for the first few words of claims, to establish linguistic patterns in the minds of users; providing a matching algorithm that can identify different wording of substantively similar claims; configuring the system to provide explanations to users about the value of searching for and using pre-existing claims; and providing a pictographic claim generator that generates or suggests language of claims based on substance supplied by the user.

Example Credibility Card

Figure 2:
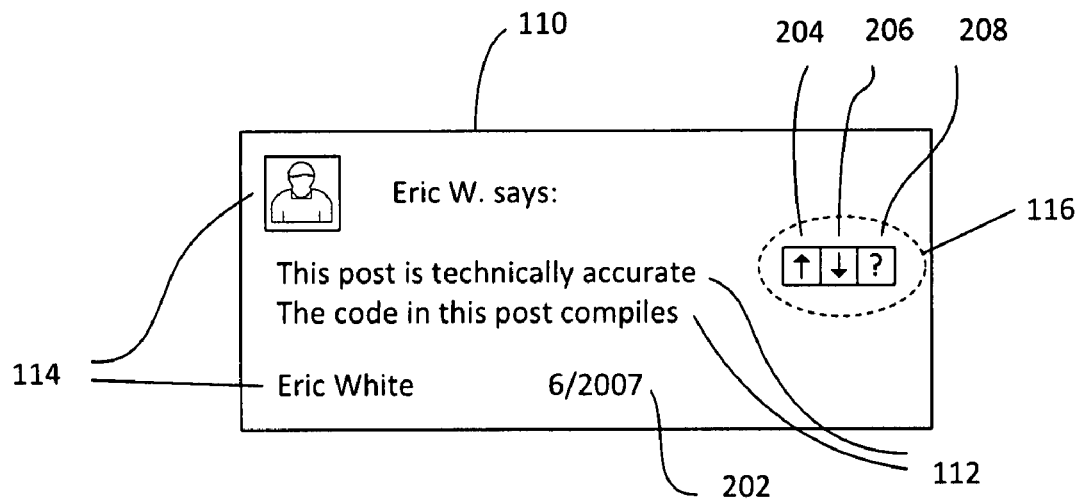
FIG. 2 is a block diagram of an example credibility card.

FIG. 2 shows an example of credibility card 110. In this example, credibility card 110 includes two claims, although any number of claims may be included. The resource to which credibility card 110 relates may be a post (e.g., a post on a "blog," on a bulletin board, etc.) that contains a description of a technical issue, and some program code relating to the technical issue. Claims 112 may be chosen based on their pertinence to the resource, and thus, the claims 112 in the example credibility card 110 are "This post is technically accurate," and "The code in this post compiles."

Credibility card 110 also includes identification 114 of the claimant that makes claims 112. In this example, the claimant is a person, and identification 114 comprises the name, and an image, of that person. The post to which credibility card 110 relates may be the information 104 that is submitted by entity 102 (both shown in FIG. 1), and the claimant identified by identification 114 may be the same as entity 102. Alternatively, the claimant could be different from the entity 102 that submitted the post. In one example, measures may be taken to ensure that entity 102 make claims about its own resources, and to resist entity 102's making a claim about a resource that entity 102 does not create.

Date 202 may be included in credibility card 110, and represents the date on which the credibility card was instantiated (the date on which claims 112 were made). To the extent that the age of a claim may bear on its validity, date 202 may assist a user in judging the credibility of claims 112, or of the claimant.

Credibility card 110 also includes a control 116, with voting buttons 204, 206, and 208. The voting button may be as graphics (as in FIG. 2), as words, or by any other mechanism. In the example of FIG. 2, the up arrow in button 204 represents the voting choice "agree" (i.e., agreement with a claim), the down arrow in button 206 represents "disagree" (i.e., disagreement with a claim), and the question mark in button 208 represents "unsuitable." For simplicity of depiction, one set of voting buttons is shown in FIG. 2, although it is desirable to include separate voting buttons for each of claims 112, so that the different claims can be voted on separately.

Example Resource

Figure 3:
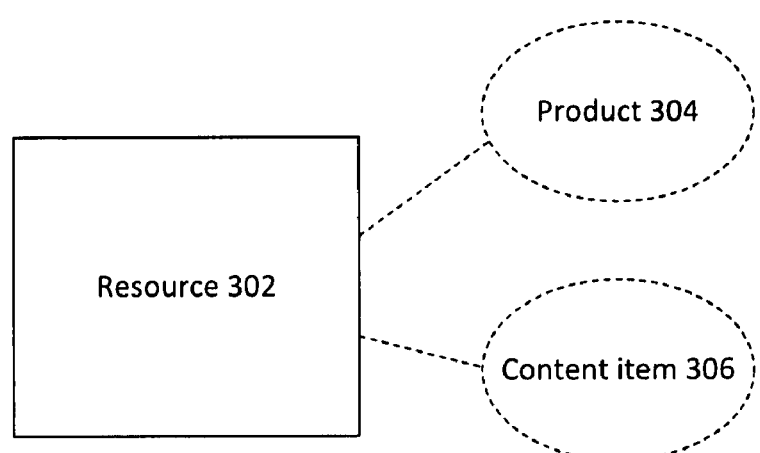
FIG. 3 is a block diagram of an example resource.

FIG. 3 shows an example resource 302, which is the subject of claim(s) 112 (shown in FIGS. 1 and 2). Resource 302 can be a tangible or intangible item to which the claims relate. Some examples of resource 302 are shown.

Resource 302 may be a product 304 (e.g., a computer, a printer, a food, etc.). In such a case, information 104 (shown in FIG. 1) may be a review of product 302, and a claim on a credibility card may relate to the product (e.g., "This computer passed all the standard speed benchmarks" or "This sushi is excellent").

In another example, resource is an information content item 306 (e.g., an on-line article, a program, a song, a video, etc.). In such a case, information 104 (shown in FIG. 1) may comprise content item 306, and a claim on a credibility card may relate to the content (e.g., "The special effects in this video are spectacular" or "Reading this article will improve your golf game").

The foregoing are merely examples of resource 302. Resource 302 could be any item, person, concept, etc., about which a claim can be made. In one example, resource 302 may be a resource for which a URI exists.

Example Processes of Using Credibility Cards

Figure 4:
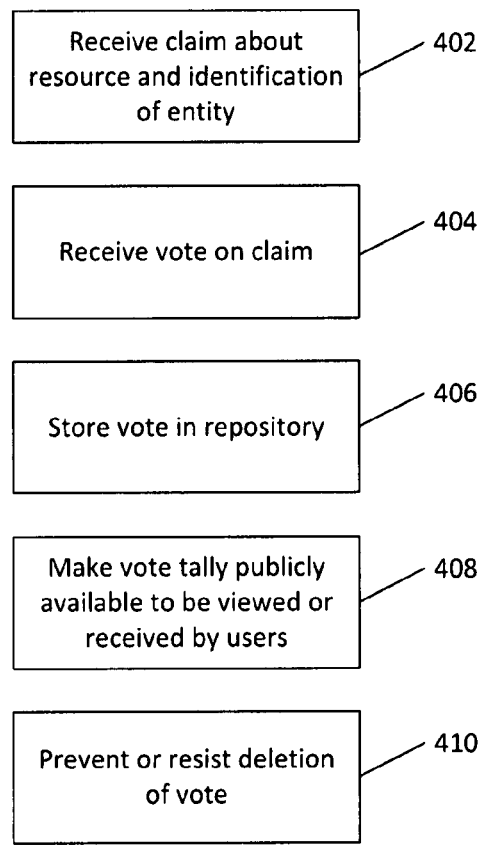
FIGS. 4, 5, and 6 are flow diagrams of example sets of actions that may be performed with respect to claims and votes.
Figure 5:
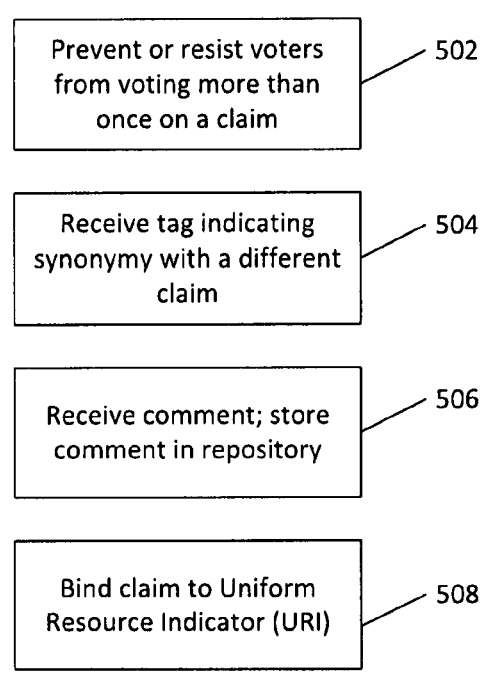
Figure 6:
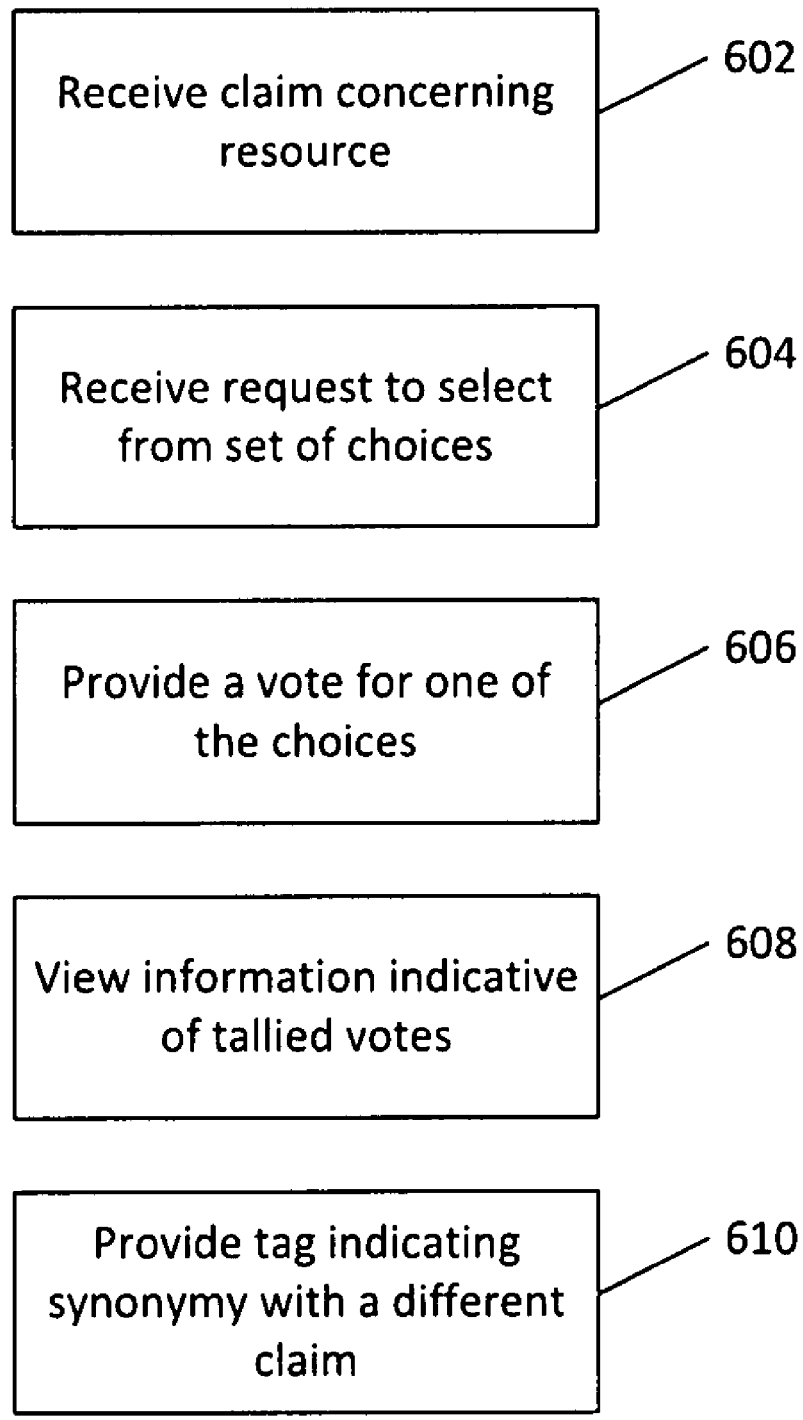

FIGS. 4, 5, and 6 show example processes of using credibility cards. The actions shown in FIGS. 4-6 may be performed in the particular combination and order shown in each of these figures. However, combinations or subsets of actions selected from one or more of the figures may be performed, and the actions need not be performed in the order shown. For purposes of illustration, certain example of the processes of FIGS. 4-6 are described below with respect to the components of FIG. 1. However, the processes of FIGS. 4-6 could be carried out using any other system.

FIG. 4 shows a set of actions that may be performed using credibility cards. For example, the operator of a web site may want to incorporate credibility cards into the material posted on that web site, and may use software to perform the actions shown in FIG. 4.

At 402, a claim about a resource, and an identification of an entity, are received. For example, if software component 106 (shown in FIG. 1) implements the actions shown in FIG. 4, then software component 106 may receive information to be posted on a web site from an entity 102, and may also receive claim 112 (both shown in FIG. 1). (The claim may be received from entity 102, or may be received from an external source, as in the case of a pre-defined claim.) The claim may be chosen based on its pertinence to a particular resource, as described above. The claim, and information that comprises or relates to the resource, may be included in a page (e.g., page 108, shown in FIG. 1), so as to be viewable by a resource consumer or other user. Measures may be taken to bind the resource to the claim, in order to resist future attempts to move the claim and/or its voting record from one resource to another, or otherwise to prevent use of a claim created for one resource with a different resource. For example, when a vote is received on a claim, the URI of the resource for which the claim was presented to the user may also be received, so that a component that receives the votes can verify that the URI for which the vote is received is the one about which the claim was originally made.

At 404, a vote is received on the claim, and at 406, the vote is stored in a repository. Referring back to FIG. 1, resource consumer 118 may provide a vote 120, which is stored in repository 122.

At 408, a tally of the cumulative vote on a claim is made publicly available, so as to be viewable or received by users. Referring back to FIG. 1, when information 128 about the vote tally 124 is made available to users 126, this scenario is an example of the action shown at 408. Information about the vote tally may be made available in any way—e.g., by providing a web page that contains raw vote data or a summary of such data, or by communicating such summary of data by other mechanisms. It will be understood that viewing or communicating such voting data is one of the various useful and tangible actions described herein, since the voting data enables users to judge the credibility of a claim to which the voting data pertains.

At 410, measures are taken to prevent deletion of votes. In some cases, a claimant may review the votes and find that the votes reflect negatively on the claim or claimant, and may wish to delete the votes. (E.g., the majority of votes may reflect disagreement with a claim, or irrelevance of the claim, and this fact can reflect negatively on the claimant.) Measures may be taken to make a vote non-repudiable, since, if votes could be deleted, then a disproportionate number of votes would indicate agreement with the claimant. Thus, measures can be taken to prevent deletion of the votes. It will be understood that, as with computer-security measures in general, such measures may not be successful in all circumstances, and thus preventing deletion of votes encompasses cases where measures are taken to prevent deletion, even if such measures ultimately do not succeed. It may be said that vote deletion is resisted, which includes (for example) the scenario where vote deletion is actually prevented, as well as the scenario where some measure (whether successful or not) is taken in furtherance of preventing vote deletion.

FIG. 5 shows acts that may be performed with respect to credibility cards. The actions shown in FIG. 5 are optional actions that can be added to the actions in FIG. 4. The actions in FIG. 5 may improve integrity of the voting process, or may improve the user experience (although the actions shown in FIG. 5 may be performed for any reason).

At 502, measures may be taken to prevent a voter from voting more than once on a claim. In addition to the measure that prevent deletion of votes as described above, preventing a given voter from voting more than once on a claim can improve the integrity of the voting process by ensuring that voters cannot disproportionately skew the vote toward the result they favor. As with the prevention of vote deletion (as shown at 410), it is possible that the measures to prevent a voter from voting more than once are not completely successful, but even such unsuccessful measures are still within the concept of preventing vote deletion. It may be said that voting more than once is resisted, which includes (for example) the scenario where voting more than once is actually prevented, as well as the scenario where measures (whether successful or not) are taken in furtherance of preventing the same user from voting more than once on a claim.

At 504, a tag is received from a user indicating that a particular claim is synonymous with another claim. For example, there may be a standard or pre-determined set of claims (e.g., "The code in this post compiles," which may apply generally to posts that contain code), and a particular claim may be phrased in a different way (e.g., "The compiler generated no error messages on this code.") For the purpose of comparing different claims relating to similar subject matter, a relationship between claims that have the same or similar meaning may be established, and this result may be accomplished by allowing a user to submit a tag indicating the synonymy between different claims.

At 506, a comment may be received from a user and stored in a repository. As described in connection with FIG. 1, the vote choices for a claim may include an option to submit a free-form comment. Such a comment can be received, and may be stored in a repository (e.g., repository 122, shown in FIG. 1).

At 508, a claim may be bound to a URI, in order to resist attempts to move a claim (and, possibly, its positive voting record) from one URI to another. This binding may foster user confidence that the claim the users are seeing with a resource (along with the identity of the claimant) was actually made by that claimant with respect to that resource, and actually accumulated its voting record based on that resource. For example, the claim "The code in this post compiles," with a 98% "agree" voting record has greater meaning to the extent that one has confidence that this claim, and its positive voting record, have not been moved from a post with good code to a post with buggy code. The binding at 508 can lessen this concern on the part of users by resisting attempts to move a claim from one resource to another.

FIG. 6 shows a set of actions that may be performed using credibility cards. For example, a consumer of a resource, or other user/viewer of a page that contains credibility cards, may perform the actions shown in FIG. 6.

At 602, a claim concerning a resource is received. For example, a consumer of a resource may download and view a web page that contains or relates to a resource, and the web page may contain a credibility card that includes a claim. This scenario is an example of the action shown at 602.

At 604, a request to select from a set of choices is received. For example, the credibility card may include a control that includes a set of voting choices and button to vote on the choices. Viewing of the buttons by the resource consumer is an example of receiving a request to select from a set of choices.

At 606, a vote is provided for one of the choices, as in the example where the resource consumer clicks on one of the voting choice buttons to register a vote.

At 608, information indicative of the tallied votes is viewed. For example, the resource consumer, or another user, may want to judge the credibility of the claim(s) contained in a credibility card, and may view the tally of votes—e.g., by downloading a web page that shows or summarizes a repository's currently tally of votes on a claim. This scenario is an example of the action shown at 608.

At 610, a tag is provided that indicates that a claim in the credibility card is synonymous with a different claim. For example, a user may, optionally, choose to indicate that a claim contained in the credibility card is, in effect, the same as a pre-determined claim. This action is similar to the action described in connection with 504 (shown in FIG. 5).

Example Implementation

Figure 7:
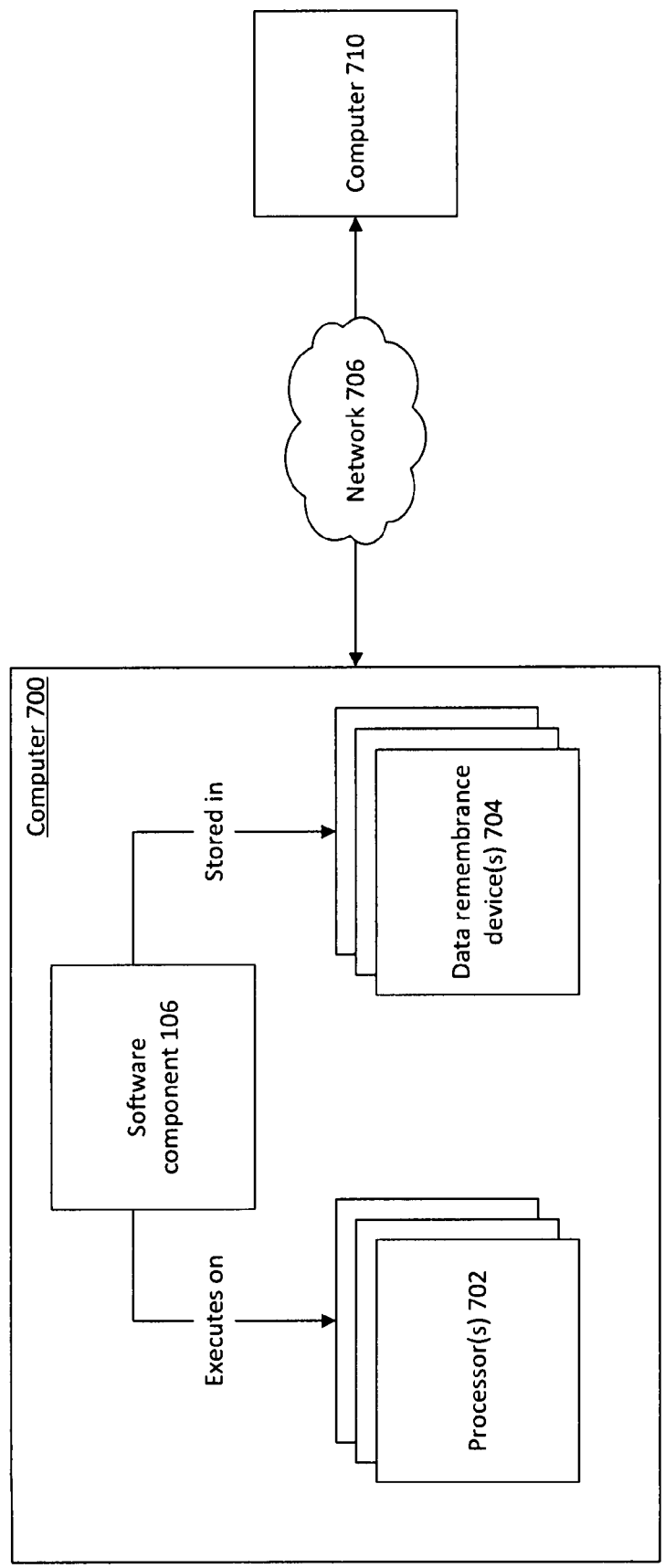
FIG. 7 is a block diagram of example components in which the subject matter described herein may be deployed.

FIG. 7 shows an example environment in which aspects of the subject matter described herein may be deployed.

Computer 700 includes one or more processors 702 and one or more data remembrance devices 704. Processor(s) 702 are typically microprocessors, such as those found in a personal desktop or laptop computer, a server, or a handheld computer. Data remembrance device(s) 704 are devices that are capable of storing data for either the short or long term. Examples of data remembrance device(s) 704 include hard disks, removable disks (including optical and magnetic disks), volatile and non-volatile random-access memory (RAM), all types of read-only memory (ROM), flash memory, magnetic tape, etc. Data remembrance device(s) are examples of computer-readable media. Computer-readable media include both storage media such as data remembrance device(s) 704, as well as media that carry data ephemerally, such as electronic, magnetic, or optical signals.

Software (such as software component 106, shown in both FIGS. 1 and 7) may be stored in the data remembrance device(s) 704, and may execute on the one or more processor(s) 702. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance device(s) 704 and that executes on one or more of the processor(s) 702. As another example, the subject matter can be implemented as software having instructions to perform one or more acts, where the instructions are stored or carried on one or more computer-readable media.

In a typical environment, computer 700 may be communicatively connected to one or more other devices through network 706. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more computer-readable storage media having computer-executable instructions to perform a method of obtaining an evaluation of a resource, the method comprising:

receiving, from an entity, a first claim about the resource and an identification of said entity, the first resource being associated with a first Uniform Resource Indicator, said first claim being chosen by said entity based on said claim's pertinence to said resource, said resource comprising program code or a description of a technical issue, said claim being that said program code compiles in a case in which said resource comprises said program code, said claim being that said description is technically accurate in a case in which said resource comprises said description;

binding said claim to said first Uniform Resource Indicator;

receiving, from one or more consumers of the resource, a vote indicating selection from a set of choices that comprises:

agreement with said first claim; and disagreement with said first claim;

storing said vote in a repository;

making said vote available to be viewed or received by users;

resisting deletion of said vote from said repository; and resisting use of said claim and said vote with a second resource associated with a second Uniform Resource Indicator.

2. The one or more computer-readable storage media of claim 1, wherein said set of choices further comprises:

an indication that said first claim is unsuitable.

3. The one or more computer-readable storage media of claim 1, further comprising:
  resisting any voter from voting on said first claim more than once.

4. The one or more computer-readable storage media of claim 1, wherein said making of said vote publicly available comprises:
  providing verbal expressions that are selected based on prevalence of different members of the set of choices, as indicated by votes of said one or more consumers.

5. The one or more computer-readable storage media claim 1, wherein said entity is a publisher or creator of the resource.

6. The one or more computer-readable storage media of claim 1, further comprising:
  receiving, from said one or more consumers, a tag indicating that said first claim is to be treated as synonymous with a second claim.

7. The one or more computer-readable storage media of claim 1, further comprising:
  receiving, from said one or more consumers, a comment pertaining to said claim; and
  storing said comment in said repository.

8. A method of obtaining an evaluation of a first resource, the method comprising:
  using a processor to perform acts comprising:
    receiving, from an entity, a claim about the first resource and an identification of said entity, the first resource being associated with a first Uniform Resource Indicator, said first resource comprising program code or a description of a technical issue, said claim being that said program code compiles in a case in which said first resource comprises said program code, said claim being that said description is technically accurate in a case in which said first resource comprises said description;
    binding said claim to said first Uniform Resource Indicator;
    communicating, to one or more consumers of the first resource, (a) first information that comprises or relates to the first resource, (b) said claim, and (c) a set of choices that comprises:
      agreement with said claim; and
      disagreement with said claim;
    receiving, from said one or more consumers, a vote indicating selection from said set of choices;
    making said vote available to be viewed or received by users; and
    resisting use of said claim and said vote with a second resource associated with a second Uniform Resource Indicator.

9. The method of claim 8, wherein said set of choices further comprises:
  an indication that said claim is unsuitable.

10. The method of claim 8, wherein said entity is a publisher or creator of said resource.

11. The method of claim 8, said acts further comprising:
  providing second information indicative of a tally of said votes, said second information comprising verbal expressions that are selected based on prevalence of different members of the set of choices, as indicated by votes of said one or more consumers.

12. A system for providing a claim concerning a resource, the system comprising:
  one or more processors;
  one or more data remembrance devices;
  a software component that is stored in at least one of said one or more data remembrance devices and that is executable on at least one of said one or more processors, said software component receiving information that constitutes or describes the resource, and that publishes a displayable page that comprises:
    (a) said information, and
    (b) a card that comprises:
      (b1) a claim that pertains to said resource,
      (b2) an identification of an entity that makes said claim, and
      (b3) a control that receives, from a viewer of said claim, a vote from a set of choices that comprises:
        agreement with said claim; and
        disagreement with said claim;
  said control causing said vote to be stored in a repository that resists deletion of said vote, and that resists use of said claim and said vote with a second resource associated with a second Uniform Resource Indicator
  said resource being associated with a first Uniform Resource Indicator, and said resource comprising program code or a description of a technical issue, said claim being that said program code compiles or said claim being that said description is technically accurate in a case in which said resource comprises said description.

13. The system of claim 12, wherein said set of choices further comprises:
  an indication that said claim is unsuitable.

14. The system of claim 12, wherein said control resists any voter from voting on said claim more than once.

15. The system of claim 12, wherein said information is received from said entity, and wherein said software component initiates creation of a said card and solicits said claim from said entity.

16. The system of claim 15, wherein said software component provides an incentive for said entity to choose said claim from one or more pre-existing claims.

17. The system of claim 12, wherein said entity is a publisher or creator of the resource.

* * * * *